No. 749,893. PATENTED JAN. 19, 1904.
E. F. BECKWITH.
GRADED PHOTOGRAPHIC FILM.
APPLICATION FILED MAY 13, 1903.
NO MODEL.
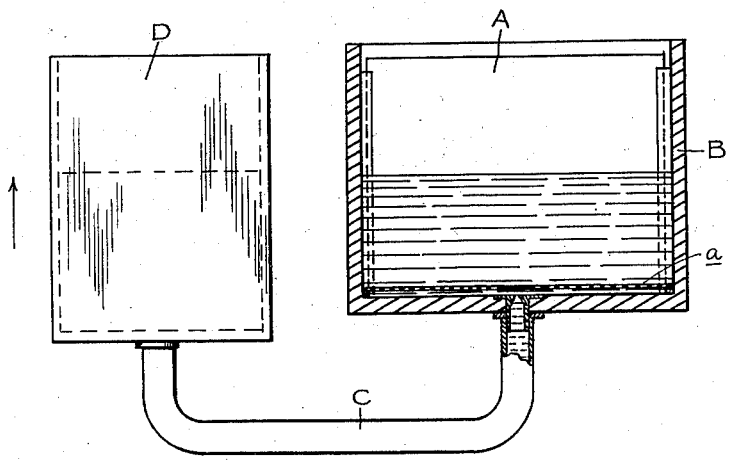
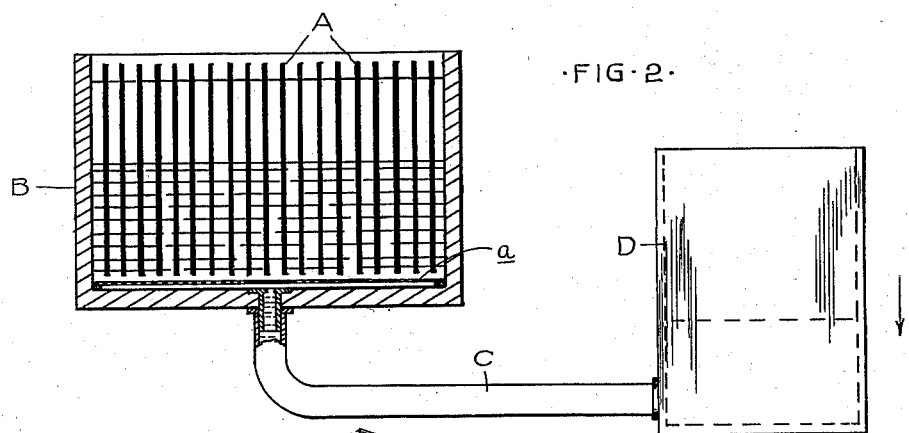
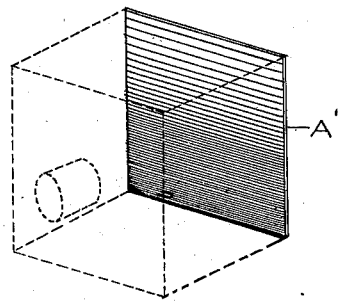
WITNESSES
INVENTOR
EDWIN F BECKWITH
BY
ATT'Y.

No. 749,893. Patented January 19, 1904.

UNITED STATES PATENT OFFICE.

EDWIN F. BECKWITH, OF IONIA, MICHIGAN.

GRADED PHOTOGRAPHIC FILM.

SPECIFICATION forming part of Letters Patent No. 749,893, dated January 19, 1904.

Application filed May 13, 1903. Serial No. 156,892. (No model.)

*To all whom it may concern:*

Be it known that I, EDWIN F. BECKWITH, a citizen of the United States, residing at Ionia, in the county of Ionia and State of Michigan, have invented certain new and useful Improvements in Graded Photographic Films, of which the following is a specification, reference being had therein to the accompanying drawings.

The invention relates to "photographic films," this term being used broadly to designate the actinically-sensitive surface, whether of the photographic plate, or what is technically known as a "film," or any other device for the purpose.

It is the object of the invention to obtain a film which is graded in sensitiveness from one portion to another; and it is a further object to obtain a film so graded as to compensate for variations in the actinic intensity of light due to differences in altitude, as will be hereinafter set forth.

The present invention is based upon the scientific principle that visual and actinic values of light are not always the same, and, further, upon the scientific fact that the actinic intensity of light from a landscape varies according to altitude. Thus a photograph of a landscape taken in the ordinary manner is either overtimed in the sky portion or undertimed in the foreground, and this difference is not merely a sudden change at the horizon, but a gradual change according to altitude.

Heretofore balanced photographic negatives of landscapes have been formed by differentially qualifying the light falling upon the sensitive film, as by the use of a graded-light screen *a* in connection with the camera. In the present invention the use of this screen is dispensed with and the balancing of the negative is obtained by the use of a film graded in sensitiveness. If this gradation is made to compensate for the natural gradation in the actinic intensity of the light, the result will be a photograph in which true visual values are obtained.

The graded photographic film forming the subject-matter of the present invention may be produced in various ways, and I do not limit myself to any particular method of manufacture. I shall, however, describe one method by which the product may be obtained, the same being illustrated in the drawings, in which—

Figure 1 is a longitudinal section through an apparatus for differentially sensitizing the film. Fig. 2 is a section at right angles thereto, and Fig. 3 is a perspective view which illustrates diagrammatically the graded film in connection with a camera indicated in dotted lines.

A is any ordinary photographic film or plate which is of uniform sensitiveness. B is a receptacle in which said plate may be placed, preferably in a vertical plane.

C is a conduit connected to the receptacle B, at the bottom thereof, and leading to a second receptacle D, the latter being capable of being raised or lowered in relation to the receptacle B.

With the apparatus as described one or a series of plates A may be placed in the receptacle B, the latter being empty. The receptacle D, which is filled with a sensitizing solution, is then placed in a position where the liquid therefrom will be gradually admitted to the receptacle B through the conduit C. The result will be that the liquid will rise in the receptacle B, so as to progressively contact with the film, the lower portion of which will be immersed in the liquid for a longer period of time than the upper portion.

The solution employed for sensitizing may be any compound which is adapted either to increase the sensitiveness of the film or to decrease the senstiveness thereof, the effect varying according to time of immersion.

The operation of sensitizing the film may be either as above described or the receptacle B may be first filled with the solution and the plates immersed therein, after which the solution is gradually drawn off, so as to progressively drain off from the film. With either method there will result a differential sensitizing action which is graded from one edge to the other of the film.

Where it is desired to obtain graded plates that are also orthochromatic, this may be accomplished by the use of a sensitizing solution which is capable of producing this effect and treating the plate with it in the manner before described.

In Fig. 3 the graded film is diagrammatically represented at A', the heavily-shaded portions indicating the less sensitive part of the film, which grades upward, the most sensitive portion being at the top.

Although I have described but one method by which the graded films may be produced, it is obvious that other ways of grading may be employed, and I believe that my invention includes within its scope any actinic surface graded in sensitiveness in any manner.

What I claim as my invention is—

1. An actinic surface for photographic use graded in sensitiveness from one portion to another thereof.

2. An orthochromatic actinic surface graded in sensitiveness from one portion to another thereof.

In testimony whereof I affix my signature in presence of two witnesses.

EDWIN F. BECKWITH.

Witnesses:
 H. C. SMITH,
 JAS. P. BARRY.